Figure 1:
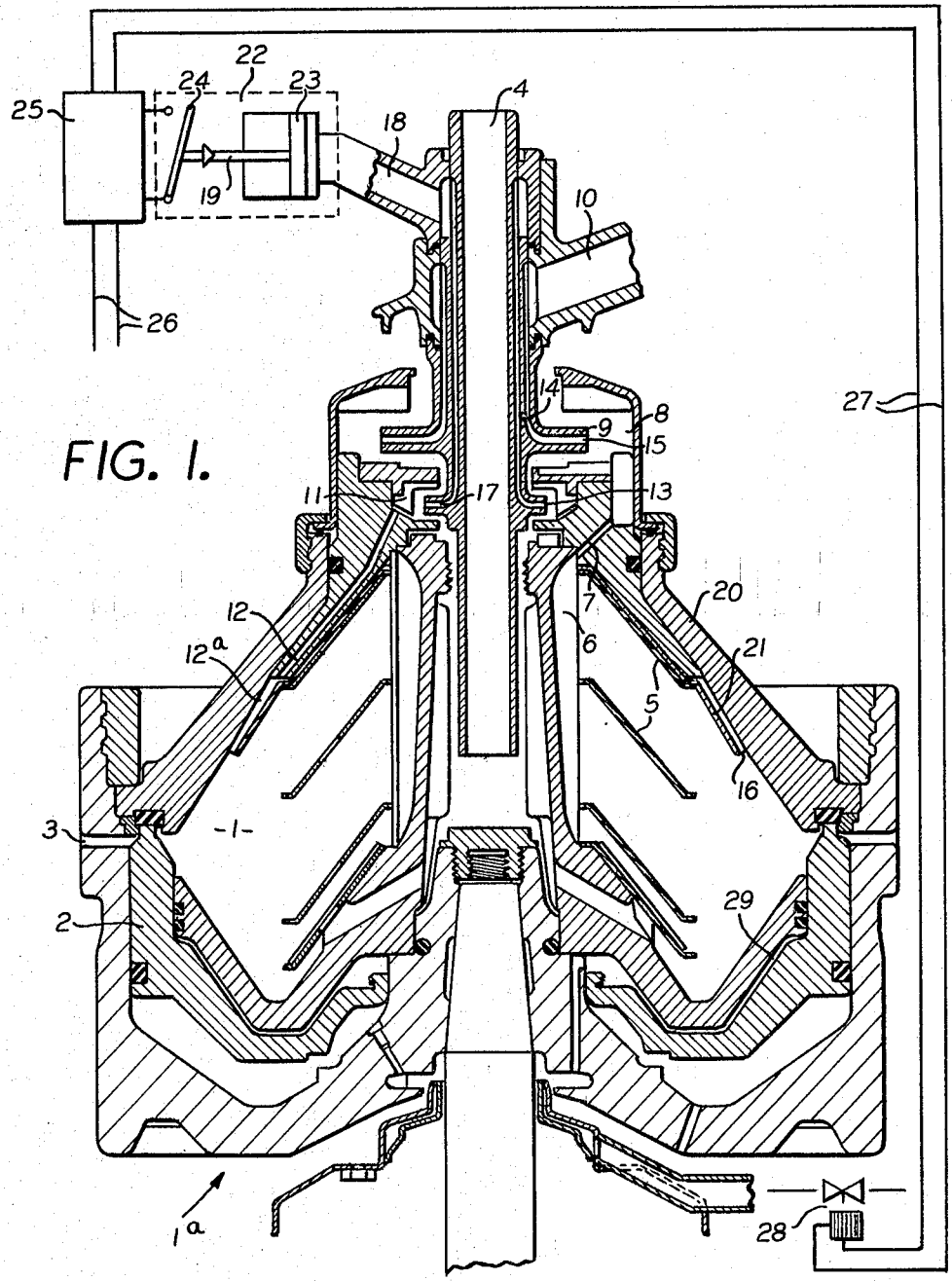

INVENTOR
HEINZ HEMFORT, JR.
BY
Burgess, Dinklage & Sprung
ATTORNEYS.

Jan. 31, 1967    H. HEMFORT, JR    3,301,476
APPARATUS FOR SIGNALING A PREDETERMINED LEVEL
IN THE SLUDGE CHAMBER OF A CENTRIFUGAL DRUM
Filed Jan. 27, 1964      2 Sheets-Sheet 2

INVENTOR
HEINZ HEMFORT, JR.
BY
Burgess, Dinklage & Sprung
ATTORNEYS.

United States Patent Office 3,301,476
Patented Jan. 31, 1967

3,301,476
APPARATUS FOR SIGNALING A PREDETERMINED LEVEL IN THE SLUDGE CHAMBER OF A CENTRIFUGAL DRUM
Heinz Hemfort, Jr., Oelde, Westphalia, Germany, assignor to Westfalia Separator A.G., Oelde, Westphalia, Germany, a corporation of Germany
Filed Jan. 27, 1964, Ser. No. 340,480
Claims priority, application Germany, Jan. 26, 1963, W 33,789
11 Claims. (Cl. 233—20)

The invention relates to centrifugal drums with a sludge or settling chamber in which components collect which are separated during the centrifuging operation from the principal amount of the liquid being separated. These components may be solids and/or liquids which are specifically heavier than the other liquid portion of the material being separated. They may represent either impurities or useful components.

For the separation of specifically heavier solids which are present in small quantities in a liquid, drums are generally used with a full-walled, cylindrical periphery, it being possible to stop these drums after relatively long operating periods for the purpose of emptying them. Centrifugal drums of this kind are used, for example, for the purification of milk and for the clarification of beverages, juices, and various other liquids.

For the centrifugal treatment of substances with a higher solid content and possibly a second, specifically heavier liquid component, it is more advantageous to use drums with tapering separation chamber walls and openings on the drum periphery, which are opened at time intervals during operation. Drums of this kind are used, for example, for the purification and dewatering of oils, in wineries, in the citrus industry, and in chemical and pharmaceutical factories.

In centrifugal drums of the above-named kinds, it is very important that the specifically heavier components gathering in the sludge chamber do not rise up too far into the separating chamber or into a plate stack contained therein, if a decrease in clarifying or separating capacity is to be avoided. In the case of centrifugal drums with a plate insert, separated solids may even completely clog the plate interstices, so that the centrifugal drum overflows in the case of constant feed. Unless the loss of clarifying or separating capacity or the overflowing of the drum is not immediately perceived by the operating personnel, considerable losses or other disadvantages may result.

The invention aims at devising a method and an apparatus for the automatic operation of a signal whenever the sludge chamber of the drum is filled up to a predetermined level with solids and/or a specifically heavier liquid. The signal can be utilized to provide an audible or visual indication of the condition or it can be utilized to initiate a controlling operation.

It is in the prior art to arrange a gamma-ray source on one side of a centrifugal drum, these rays passing axially through the sludge chamber at the desired distance from the drum axis. When the solids reach the path of the rays, the radiation intensity to be measured on the opposite side of the drum becomes less, due to the greater radiation absorption, whereby notice is given to the operating personnel that the solids have reached this level. The operation of such radiation sources inherently involves perils, and their installation in the centrifuge frame involves considerable expense because the harmful radiation must not be permitted to pass outwardly from the centrifuge frame. Furthermore, such a system requires, in addition to the radiation source, a corresponding receiver, which measures the unabsorbed amount of radiation and must be disposed precisely opposite the radiation source. Furthermore, radioactive preparations are very expensive.

In a centrifugal drum of the self-opening type that has been disclosed in printed literature, one or more passages lead from the sludge chamber to the vicinity of the drum axis and carry a portion of the liquid through nozzles to the outside. This current of liquid stops if ever the inlet orifice of the passage is covered by the layer of solids. The liquid drawn off from the sludge chamber is carried to a vessel located on a beam scale and provided with an adjustable floor opening. The bottom drain of this vessel is to be adjusted in such a manner that the outcoming amount of liquid is equal to the incoming. As soon as the liquid flow to the vessel is interrupted, it begins to empty itself, the load arm of the beam scale moves upward and, through a mercury switch, energizes a motor which brings about the opening of the drum and thus the ejection of the sludge.

It is well known that the liquid drawn out of the sludge chamber of a centrifugal drum has a considerably higher solid content than the main quantity which is derived from the central portion of the drum after passing the plate stack. Now, if the liquid represents the useful component of a substance being centrifuged, as is the case for example in the beverage industry, the liquid drawn out of the sludge chamber must not go to waste. Therefore, in the use of the prior-art system wherein a beam balance is used, it must be fed back by a pump to the inlet of the drum. But the greater the amount of recirculated liquid is, the lower the effective throughput of the drum is. So an effort must be made to keep the amount of liquid to be drawn from the sludge chamber as small as possible, i.e., to give the passages as small a cross-section as possible. This meaure, however, reintroduces the danger of clogging, inasmuch as in these passages the separating force and the flow are opposite in direction from one another.

The poor reliability, the great expense and the unstable behavior of a beam scale are probably the reasons why this known system has not been adopted in practice.

An important feature of the process of the invention consists in the fact that liquid is introduced into the sludge chamber from a chamber in the vicinity of the drum axis, and the displacement of the free liquid level in this chamber produced by its filling in response to sludge accumulation is utilized for the operation of a signal and/or a controlling impulse. A small portion of the purified liquid can be used as the liquid for such operation. The passages can then have a very small cross-section since clogging cannot occur. Since the recirculated amount of liquid can be made extremely small, the throughput of the drum remains practically unaltered.

However, a portion of the substance being fed in for centrifugation can also be introduced into the sludge chamber. In this case, the passages can have a large cross-section. The throughput of the drum is not adversely affected at all because the direct introduction to movable contact 24, which in turn is electrically considered as a second feed parallel to the main feed. Clogging of the passages cannot occur because their cross-section is great and the separating force and flow are in the same direction. Therefore no separation of the components occurs in these passages.

If the solids that are separated constitute the useful component, a solid-free, foreign liquid can be introduced into the sludge chamber in small quantities.

During the centrifuge operation the free liquid levels in the central chamber and in the separating chamber of the drum are at the same distance from the drum axis. Since liquid is being fed continuously to this chamber, a flow from the chamber to the sludge chamber takes place corresponding to the amount of liquid being fed in, in order to maintain the above-mentioned equilibrium. Now, if external pressure bearing upon the orifices of the passages becomes greater due to their being covered by heavier components, the free liquid level in the chamber shifts closer to the drum axis, until the liquid pressure prevailing in the interior of passages again maintains equilibrium to the elevated external pressure.

This shifting of the free liquid level is utilized to indicate the filling of the sludge chamber and, if desired, to start the desludging process.

The apparatus for the performance of the process is characterized by a chamber provided on the drum head, which is provided on the side facing the drum axis with at least one opening for receiving purified or unpurified feed liquid or a foreign liquid, and from whose radially outer portion one or more passages lead to the sludge chamber. An element which is disposed in the chamber responds to shifting of the free liquid level and cooperates with a hydraulically operated contact or other suitable liquid level sensitive means.

Thus, the invention provides a centrifugal separator having a drum for receiving material to be centrifuged therein and including a sludge collection chamber, and a radially extending passageway having an inlet end and an outlet end, with the outlet end communicating with the drum sludge collection chamber. Means are provided for supplying liquid to the inlet for flow through the radially extending passageway to and into the sludge collection chamber. Further, means are provided for sensing increase in pressure of fluid in said passageway in consequence of collection of sludge at the passageway outlet end, which impedes fluid flow through the passageway. Also included are means responsive to the sensing means for signaling the collection of sludge which impedes flow through the passageway.

Figure 2:
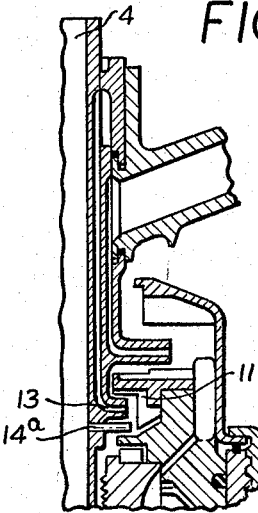
Figure 3:
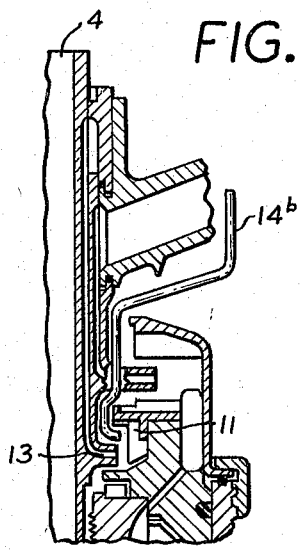

The invention is further described in the accompanying drawing, wherein:

FIG. 1 is a cross-sectional view, in elevation, of a self-desludging centrifuge drum, provided with signaling means according to the invention and means for supplying a portion of the centrifuged liquid into the sludge chamber, FIG. 2 is a view of a part of a centrifuge as is shown in FIG. 1, provided with means for supplying a portion of the liquid to be centrifuged into the sludge chamber, and FIG. 3 is a view of a part of the centrifuge as shown in FIG. 1, provided with means for supplying a foreign liquid into the sludge chamber.

In the various views of the drawing like reference characters refer to corresponding parts.

1 designates the sludge chamber in centrifugal drum 1a and in which the heavier components separated from the crude liquid collect, and from which these components are ejected through the openings 3 upon the downward movement of the piston slide valve 2. In known manner, the crude liquid is introduced through the feed pipe 4, flows through the plate stack 5 and passes as purified liquid out of the central portion 6 through passages disposed as is passage 7, into the skimming chamber 8, from which it is skimmed by means of a skimming disc 9 and fed through the pipeline 10. The drum 1a is rotated in known manner relative to the skimming member 9.

Beneath the skimming chamber 8 there is disposed an auxiliary chamber 11 from whose radially outwardly directed passages, such as passage 12, the liquid is led to an annular passage 12a which empties into the sludge chamber 1. On the side of chamber 11 adjacent the drum axis, there is disposed auxiliary skimming disc 17 having a passage 13 opening into chamber 11, and which communicates by means of a hole 14 with a skimming channel 15 of the skimming disc 9, so that a small portion of the purified liquid is continuously passed over into skimming chamber 11.

Through a constant flow, corresponding to the amount of liquid fed in from the auxiliary chamber 11 to the sludge chamber 1, the free liquid levels on the inlet side of the drum and in auxiliary chamber 11 are kept at practically the same depth. As soon as the heavier components cover the orifice 16 of the annular channel 12a, the pressure upstream of the orifice 16 in passages 12, becomes greater. In order to preserve the equilibrium with this elevated pressure, the free liquid level in chamber 11 shifts inwardly and finally reaches the passage 13 of the auxiliary skimming disc 17 which serves as the responding member. By the immersion of the skimming disc 17 into the liquid rotating with chamber 11, an overpressure is produced in the passage 13 which opposes the flow of the liquid that passes through hole 14 into passage 13. The static overpressure developing in this manner in passage 13 is propagated through the lead-off pipe 18 to the controller 19 which actuates appropriate circuits and controls. The controller 22 includes piston-cylinder arrangement 23 which is operatively connected to lead-off pipe 18 for response to increase in pressure in pipe 18 and is operatively connected to movable contact 4, which in turn is electrically connected with switch box 25. Leads 26 provide power to the switch box 25 and leads 27 interconnect the switch box and the electrically controlled valve 28 in the feed line for operating liquid. Upon increase in pressure in pipe 18, the contact 24 closes whereupon the switch 25 energizes the valve 28 for supplying operating liquid into the opening chamber 29, whereby the piston valve 2 is caused to move downward and open the passages 3 for discharge of sludge. Appropriate timing elements can be included in the switch box 25 to provide a suitable cycling of operation for sludge discharge.

The covering plate 21 forming with drum cover 20 the passage 12 is of such a length that the liquid level in chamber 11 reaches the skimming passages 13 when the heavier components just reach the outer margin of the covering plate 21.

The skimming member 13 can be replaced by another device, as for example a float.

In the embodiment shown in FIG. 2, the fluid used for the signaling is fed to the centrifuge, rather than purified liquid produced by the centrifuge. The chamber 11 is provided with a pipe or hole 14a positioned so that feed from the feed pipe can flow into the chamber 11. In this embodiment other appropriate modifications would be provided so that the feed liquid would serve as the signaling liquid.

In the embodiment shown in FIG. 3 a pipe 14b leads from the chamber 11 to the outside for introducing a foreign liquid into the chamber 11 and from there into the sludge room, when the solids are the useful component.

What is claimed is:
1. Centrifugal separator comprising:
(a) a drum for receiving material to be centrifuged by the separator including a sludge collection chamber, and being mounted for rotation about an axis for the centrifuging,
(b) a radially extending passageway having an inlet end and an outlet end, the outlet communicating with the drum sludge collection chamber, the inlet being closer to the drum axis than the outlet,
(c) means communicating with said inlet end for supplying fluid to the inlet for flow through said radially extending passageway to and into the sludge collection chamber,
(d) means for sensing increase in pressure of fluid in said passageway in consequence of collection of sludge at the passageway outlet end impeding fluid flow through the passageway, said means for sensing pressure being in operative communication with said passageway, and (e) means responsive to said sensing means for signaling said collection of sludge impeding flow through the passageway.

2. Apparatus according to claim 1, and conduit means for removing the lighter fraction of material centrifuged in the drum, and means for supplying a portion of said lighter fraction to said inlet end of said passageway, whereby a portion of said lighter fraction can be used as the fluid passed through said passageway.

3. Apparatus according to claim 1, the drum having openings about its periphery for discharge of sludge from the drum, and a piston valve for controlling said openings, the said means responsive to said sensing means controlling the operation of said piston valve.

4. Apparatus according to claim 1, the centrifuge including a plate stack within said drum, the plates of which extend radially outwardly from adjacent the drum axis to termination spaced from the drum periphery, the said outlet end of said passageway being disposed intermediate the drum periphery and the plate stack.

5. Apparatus according to claim 4, said inlet end of the passageway being disposed adjacent the drum axis.

6. Apparatus according to claim 1, said means for sensing increase in pressure in said passageway including a skimming chamber disposed about said drum axis, the inlet end of said passageway communicating with said chamber, a skimming disc for said skimming chamber and conduit means for receiving fluid from the skimming disc connected to a device sensitive to fluid pressure in said conduit means.

7. Apparatus according to claim 6, and conduit means for removing the lighter fraction of material centrifuged in the drum, and means for supplying a portion of said lighter fraction to said inlet end of said passageway, whereby a portion of said lighter fraction can be used as the fluid passed through said passageway.

8. Apparatus according to claim 6, including a skimming chamber having a skimming disc disposed therein and a skimming disc outlet conduit for removal of lighter fraction of material centrifuged in the drum, and means communicating the lighter fraction skimming disc outlet conduit with the said inlet end of the passageway communicating with the drum sludge collection chamber, whereby a portion of said lighter fraction can be used as said fluid supplied to the inlet end of said passageway.

9. Apparatus according to claim 6 and conduit means for supplying a foreign liquid to said inlet end of said passageway whereby the foreign liquid can be used as the fluid passed through said passageway.

10. Apparatus according to claim 6, and conduit means for supplying feed to said centrifuge and means communicating with said feed supply conduit means for supplying a portion of said feed to said inlet end of said passageway, whereby a portion of said feed can be used as the fluid passed through said passageway.

11. Apparatus according to claim 10, said feed conduit being disposed along the drum axis.

References Cited by the Examiner
UNITED STATES PATENTS

| | | | |
|---|---|---|---|
| 2,344,888 | 3/1944 | Lindgren | 233—21 |
| 3,135,691 | 6/1964 | Hemfort | 233—22 |
| 3,167,509 | 1/1965 | Steinacker | 233—20 |

M. CARY NELSON, *Primary Examiner.*

HENRY T. KLINKSIEK, *Examiner.*